US012241028B2

(12) United States Patent
Sandberg et al.

(10) Patent No.: US 12,241,028 B2
(45) Date of Patent: Mar. 4, 2025

(54) HYDROCARBON COMPOSITION

(71) Applicant: Neste Oyj, Espoo (FI)

(72) Inventors: Kati Sandberg, Porvoo (FI); Väinö Sippola, Porvoo (FI); Janne Suppula, Porvoo (FI); Jesse Vilja, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 18/481,427

(22) Filed: Oct. 5, 2023

(65) Prior Publication Data

US 2024/0026235 A1  Jan. 25, 2024

Related U.S. Application Data

(63) Continuation of application No. 17/766,432, filed as application No. PCT/EP2020/082461 on Nov. 18, 2020, now Pat. No. 11,859,143.

(30) Foreign Application Priority Data

Nov. 19, 2019 (FI) ..................................... 20195987

(51) Int. Cl.
 C10G 69/02 (2006.01)
 C10L 1/08 (2006.01)
 C10L 10/14 (2006.01)

(52) U.S. Cl.
 CPC ............... *C10G 69/02* (2013.01); *C10L 1/08* (2013.01); *C10L 10/14* (2013.01); *C10G 2300/1014* (2013.01); *C10G 2300/1018* (2013.01); *C10G 2300/304* (2013.01); *C10G 2300/308* (2013.01); *C10G 2400/08* (2013.01); *C10L 2200/043* (2013.01); *C10L 2200/0484* (2013.01); *C10L 2270/04* (2013.01)

(58) Field of Classification Search
 CPC ... C10G 2/30; C10G 3/00; C10G 3/47; C10G 3/50; C10G 45/48; C10G 45/58; C10G 69/02; C10G 2300/1011; C10G 2300/1014; C10G 2300/1018; C10G 2300/1022; C10G 2300/1048; C10G 2300/304; C10G 2300/308; C10G 2400/08; C10L 1/02; C10L 1/026; C10L 1/04; C10L 1/08; C10L 10/14; C10L 2200/043; C10L 2200/0484; C10L 2290/543
 See application file for complete search history.

(56) References Cited

U.S. PATENT DOCUMENTS

| 8,795,394 | B2 | 8/2014 | Sugano |
| 9,505,986 | B2 | 11/2016 | Iguchi et al. |
| 2008/0244962 | A1 | 10/2008 | Abhari et al. |
| 2009/0235575 | A1 | 9/2009 | Sugano |
| 2009/0299109 | A1 | 12/2009 | Gruber et al. |
| 2012/0046506 | A1 | 2/2012 | Okabe et al. |
| 2012/0209038 | A1 | 8/2012 | Iguchi et al. |
| 2013/0109893 | A1 | 5/2013 | Robota et al. |
| 2014/0323777 | A1 | 10/2014 | Iguchi et al. |
| 2016/0046872 | A1 | 2/2016 | Lindberg et al. |
| 2017/0009144 | A1 | 1/2017 | Aalto et al. |
| 2023/0140527 | A1 | 5/2023 | Sandberg et al. |

FOREIGN PATENT DOCUMENTS

| EP | 2141217 A1 | 1/2010 |
| EP | 2361961 A2 | 8/2011 |
| EP | 3187567 A1 | 7/2017 |
| JP | 2010150479 A | 7/2010 |
| JP | 2011052074 A | 3/2011 |
| JP | 4863772 B2 | 11/2011 |
| WO | 2005026297 A1 | 3/2005 |
| WO | 2009062208 A2 | 5/2009 |
| WO | 2009151692 A2 | 12/2009 |
| WO | 2010000934 A1 | 1/2010 |
| WO | 2015193463 A1 | 12/2015 |
| WO | 2018224730 A1 | 12/2018 |
| WO | 2021099343 A1 | 5/2021 |

OTHER PUBLICATIONS

ASTM International, "Standard Test Method for Density and Relative Density of Liquids by Digital Density Meter", ASTM International D 4052-96, vol. D4052, May 2022. (5 pages).
ASTM, "Standard Test Method for Distillation of Petroleum Products at Atmospheric Pressure", ASTM D 86-00, May 2023. (22 pages).
Finnish Patent Search Report issued in corresponding U.S. Appl. No. 20/195,987 dated Mar. 18, 2020.
International Preliminary Report on Patentability (PCT/IPEA/409) issued on Oct. 26, 2021, by the European Patent Office as the International Search Authority for International Application No. PCT/EP2020/082461.
International Search Report (PCT/ISA/210) and Written Opinion (PCT/ISA/237) with English translation mailed on Feb. 24, 2021, by the European Patent Office as the International Searching Authority for International Application No. PCT/EP2020/082461.
M. Lapuerta et al., "Molecular Interactions in Blends of Alcohols with Diesel Fuels: Effect on Stability and Distillation", The Science and Technology of Fuel and Energy, Jan. 2015, pp. 171-179, vol. 139.

(Continued)

*Primary Examiner* — Brian A McCaig
(74) *Attorney, Agent, or Firm* — Buchanan Ingersoll & Rooney, PC

(57) ABSTRACT

Disclosed is a hydrocarbon composition containing isomerized paraffins having specific cut-off points in a distillation curve, a density from 768.0 to 772.0 kg/m$^3$, a freezing point of equal to or lower than −40° C., and an amount of isomerized paraffins of over 90 wt-% as calculated from total paraffinic content of the hydrocarbon composition. The hydrocarbon composition can be used in combination with a fuel or fuel component, especially a jet fuel. Disclosed is also a method to produce a hydrocarbon composition. The isomerized paraffins in the hydrocarbon composition can be from a renewable source.

14 Claims, No Drawings

(56) References Cited

OTHER PUBLICATIONS

Notice of Opposition issued on Jun. 13, 2023, by the European Patent Office in corresponding European Patent No. 3994236. (52 pages).
Office Action and Search Report issued in corresponding Patent Application No. 2051333-9 dated Nov. 16, 2020.
Office Action issued on Aug. 30, 2022, by the Japanese Patent Office in corresponding Japanese Patent Application No. 2022-520926, and an English Translation of the Office Action. (8 pages).
R. Santos et al.; ASTM D86 Distillation Curve: Experimental Analysis and Premises for Literature Modeling, The Science and Technology of Fuel and Energy, vol. 284, Jan. 2021. (13 pages).
R.V. Gough, et al., "Composition-Explicit Distillation Curves of Alternative Turbine Fuels", Energy & Fuels, Dec. 2012, p. 294.
Starck et al., "Production of Hydroprocessed Esters and Fatty Acids (HEFA)—Optimisation of Process Yield", Oil & Gas Science & Technology, vol. 71, No. 1, Jun. 23, 2014, 10 pages.
T. Smagala et al., "Hydrocarbon Renewable and Synthetic Diesel Fuel Blendstocks: Composition and Properties", Energy & Fuels, Jan. 2013, pp. 237-246.
"Standard Specification for Aviation Turbine Fuel Containing Synthesized Hydrocarbons", ASTM D7566-14c, An American National Standard, 2015, pp. 12-13.
Hasegawa, "New Ignitability Index (new cetane index) for Diesel Oil", ENEOS Technical Review, Oct. 2014, vol. 56, No. 3, with a machine English translation. (11 pages).
Kuramochi, Development and Evaluation of Next-Generation Biodiesel Fuel Production Technology Using Waste Oils and Fats as Feedstock in an Aerial-Venous Linkage (K2114, K22070, K2305), 2011 Comprehensive Research Report on Research Projects Funded by Comprehensive Environmental Research Promotion Grants, Mar. 2012, with a machine English translation (574 pages).
Office Action issued on Apr. 23, 2024, by the Japanese Patent Office in corresponding Japanese Patent Application No. 2023-042347, and an English Translation of the Office Action. (14 pages).

HYDROCARBON COMPOSITION

CROSS-REFERENCES TO RELATED APPLICATIONS

This application is a continuation of International Patent Application No. PCT/EP2020/082461, filed on Nov. 18, 2020, which claims priority to Finnish Patent Application No. 20195987, filed on Nov. 19, 2019, the entire contents of all of which are hereby incorporated by reference.

FIELD

The present invention relates to a hydrocarbon composition comprising isomerised paraffins in general and in particular to a hydrocarbon composition having an excellent freezing point and being useful as a component in or as an aviation fuel.

BACKGROUND

Jet fuel or aviation fuel is a fuel intended for use in aircraft powered by gas-turbine engines. The most commonly used aviation fuels Jet A and Jet A-1 are produced to a standardized international specification. Jet fuel is a mixture of different hydrocarbons. Their sizes, molecular weights or carbon numbers are resulting from the physical properties required by the product specification, e.g. flash point, freezing point, boiling range. Kerosene-type jet fuel (including Jet A and Jet A-1) typically has a carbon number distribution between about 8 and 16 carbon atoms per molecule.

Fossil fuels or petroleum-based fuels may be at least partly replaced by fuels from biological sources or other renewable sources. The renewable aviation fuel demand is growing in the future due to global initiatives to decrease the emissions of GHG, $CO_2$, etc. One possible key solution is to increase the use of renewable fuels in aviation fuels. Fuels from biological sources may include renewable feedstocks such as fats and/or oils. Several types of fuels may be obtained from these triacylglycerol-containing feedstocks. One example of a product that may be obtained from lipid feedstocks, is a fuel which is produced from the fat or oil by a hydrodeoxygenation reaction at an elevated temperature and pressure in the presence of a catalyst.

The formed hydrocarbons from the hydrodeoxygenation reaction of the triacylglycerol-containing feedstocks typically needs to be isomerised before the composition fulfils fuel specification. Isomerisation of the hydrocarbons lowers the melting point of the hydrocarbons and thereby improves the cold flow properties of the composition. Isomerisation of hydrocarbons is a form of hydrocracking and in extensive isomerisation conditions there is a risk of lowering the carbon number of the hydrocarbons.

Other methods for producing a hydrocarbon aviation fuel from renewable sources includes hydrocracking with or without isomerisation. Fractionation of the hydrocarbons produced from renewable sources might be necessary to produce an aviation fuel with good freezing point.

Publication WO 2018/224730 describes a multipurpose fuel composition comprising petroleum based jet fuel component and renewable jet fuel component, wherein the fuel composition has a freezing point of −40° C. The renewable jet fuel component comprises isomerised and normal paraffins, which originates from vegetable oil or animal fats.

Publication WO 2005/026297 describes a fuel composition comprising a petroleum based kerosene fuel and a Fischer-Tropsch derived kerosene fuel, comprising normal and iso-paraffins. The Fischer-Tropsch derived kerosene component described in the publication has a density typically from 730 to 770 $kg/m^3$.

Low temperature properties of aviation fuels are crucial to ensure adequate and reliable system operation of the aircraft. The freezing point of aviation fuel is an important property to secure pumpability of the fuel in all conditions.

The yield of the component that fulfils the aviation fuel properties is also important, especially when the component is produced from a biological or renewable source. Density of the fuel component is important property used in flow calculations, fuel loading, fuel tank design, metering-devices etc. Fuel density variations can have a significant impact on determining aircraft loaded weight and the range attainable.

BRIEF DESCRIPTION

An object of the present invention is thus to provide a hydrocarbon composition with an increased yield and density, excellent freezing point together with composition properties that enables the composition to be used as an aviation fuel or as a component in aviation fuel.

According to an aspect of the invention, it is provided a hydrocarbon composition comprising isomerised paraffins, wherein
the hydrocarbon composition has a T10 (° C.) cut-off temperature from 185 to 205° C., a T90 (° C.) cut-off temperature from 270 to 295° C. and a final boiling point (° C.) from 275 to 300° C., and
the density of the hydrocarbon composition is from 768.0 to 772.0 $kg/m^3$, and
the average carbon number of the hydrocarbons in the hydrocarbon composition is from 14.3 to 15.1.

According to another aspect of the invention, it is provided a fuel or fuel component comprising a hydrocarbon composition according to the invention.

According to another aspect of the invention, it is provided a method to produce a hydrocarbon composition according to the invention.

Embodiments of the invention are defined in the dependent claims and in the detailed description below.

Advantages of the hydrocarbon composition according to the invention is the that the composition has a high density in combination with excellent freezing point. This combination enables flexibility in blending the component with petroleum based aviation fuel. An excellent freezing point of the aviation fuel component is also advantageous in long distance flights, especially at high altitudes. Aviation fuel with excellent freezing point can also be used in extreme weather conditions and provide security of use in all conditions, which can be a benefit e.g. in military use.

DETAILED DESCRIPTION

Jet fuel or aviation fuel is fuel aimed for use in aircrafts powered by gas-turbine engines. Jet fuel needs to fulfil certain physical properties in order to be classified as jet fuel. The standards for definition of jet fuel include at least DEF STAN 91-091 (2018), ASTM D1655-19 (JetA-1) and ASTM D7566-19.

One of the most important properties for jet fuel is the freezing point. The freezing point is a measurement of the temperature at which visible solid fuel wax particles disappear on warming a composition, which has been cooled to a temperature where visible particles occur. The freezing point of a Jet A (ASTM D1655-19) standard jet fuel must be at least −40° C. and for a Jet A-1 fuel at least −47° C. Density is another important property for any fuel but especially for jet fuel.

A low freezing point of a hydrocarbon composition is typically associated with hydrocarbons with lower carbon number. Hydrocarbons with lower carbon number also have a lower density. A short chain length paraffin therefore has a lower density compared to a paraffin with longer chain length. However, the freezing point is lower for short chain paraffins.

Surprisingly, it has now been achieved a hydrocarbon composition with a high density and a low freezing point that satisfy the jet fuel specification. This is achieved setting certain cut-off points for the distillation curve of the hydrocarbon composition.

An embodiment of the current invention is therefore a hydrocarbon composition comprising isomerised paraffins with certain cut-off points for the distillation curve and high density. The freezing point of the hydrocarbon composition fulfils the jet fuel specification of equal to or lower than −40° C.

With a hydrocarbon composition is hereby meant a composition comprising mainly hydrocarbons i.e. organic molecules containing only carbon and hydrogen atoms. The hydrocarbon composition can contain minor amounts of molecules containing heteroatoms such as sulphur. The hydrocarbon composition according to the invention is useful as a fuel component, especially as a jet fuel component.

The hydrocarbon composition according to the current invention comprised isomerised paraffins (or i-paraffins or iso-paraffins). With isomerised paraffins is hereby meant paraffins with one or more side chain. The side chains are typical in form of methyl, ethyl and propyl substituents and can be situated anywhere on the paraffin chain. The isomerised paraffins can be produced by isomerisation of normal paraffins (n-paraffins). The isomerised paraffins can be from any source. Non-limiting examples of sources for the isomerised paraffins are hydrocarbons produced by hydrodeoxygenation of fatty acids or hydrocarbons produced in a Fischer-Tropsch process.

The invention relates to a hydrocarbon composition, which has a T10 (° C.) cut-off temperature from 185° C. to 205° C. The T90 (° C.) cut-off temperature of the composition is from 270° C. to 295° C. and the final boiling point (° C.) is from 275° C. to 300° C. The distillation conditions and properties of the collected fraction vary with the process used for producing the isomerised paraffins and the renewable source used. The person skilled in the art is well familiar with various distillation and fractionation processes and can optimize the conditions needed to obtain the hydrocarbon composition according to the invention.

The hydrocarbon composition according to the invention has a density from 768.0 kg/m$^3$ to 772.0 kg/m$^3$. In another embodiment of the invention the density of the hydrocarbon composition is from 770.0 kg/m$^3$ to 772.0 kg/m$^3$, and in yet another embodiment from 771.0 kg/m$^3$ to 772.0 kg/m$^3$. The density ranges shall be interpreted to include the density equal to the endpoints of the ranges. It should be noted that even a small increase in the density of the hydrocarbon composition is significant. A higher density of the composition means there is more energy and higher heat value (caloric value) per volume. This is significant especially in fuel applications, since the volume of the fuel tanks are always limited. In addition, higher density also gives benefits when the hydrocarbon composition is blended with other components. For example, the minimum density for jet fuel is 775 kg/m$^3$ (ASTM D7566) and if the density of the renewable component is higher then there is more flexibility for the density of the petroleum based jet fuel component.

The density of the hydrocarbon composition can be measured using any standardised method for measuring density of a hydrocarbon fuel composition, such as ASTM D4052.

In one embodiment the invention the hydrocarbon composition comprises hydrocarbons with an average carbon number from 14.3 to 15.1. In another embodiment the average carbon number of the hydrocarbons in the composition is from 14.5 to 15.1 and in yet another embodiment from 14.7 to 15.0. The carbon number ranges shall be interpreted to include hydrocarbons with carbon number equal to the endpoints of the ranges.

Average carbon number for the hydrocarbons in the hydrocarbon composition is measured using a gas chromatography (GC) method. The conditions for the GC method are listed below in table 1.

TABLE 1

GC settings for determination of carbon number of hydrocarbons

| | GC |
|---|---|
| Injection | split/splitless-injector |
| | Split 80:1 (injection volume 0.2 μL) |
| Column | DB ™-5 (length 30 m, i.d. 0.25 μm, phase thickness 0.25 μm) |
| Carrier gas | He |
| Detector | FID (flame ionization detector) |
| GC program | 30° C. (2 min)-5° C./min-300° C. (30 min), constant flow 1.1 mL/min |

It was surprisingly found that a hydrocarbon composition with high carbon number and high density could be achieved without sacrificing the freezing point of the hydrocarbon composition. Higher carbon numbers typically mean lower freezing points.

According to an embodiment of the invention the amounts of hydrocarbons in the hydrocarbon composition having a carbon number from 14 to 17 is at least 60 wt-% of the whole hydrocarbon content.

According to an embodiment of the invention the hydrocarbon composition comprises isomerised paraffins over 90 wt-%, preferably over 92 wt-% and most preferably over 95 wt-% as calculated from the total paraffinic content of the hydrocarbon composition. The isomerised paraffins are mainly mono-, di or tri-isomerised, but some paraffins can have even more side chains. The isomerised paraffins can be methyl-, ethyl- or propyl-substituted. The hydrocarbons composition according to the invention is a mixture of various isomerised paraffins. It should be noted that the carbon number does not vary with the degree of isomerisation or the type of side chain. The numbers of carbons in the paraffin remains the same.

The high degree of isomerisation enables the unique properties of the hydrocarbon composition of the invention. Typically, a higher degree of isomerisation means lower freezing points. However, the isomerisation degree in itself does not sufficiently explain the low freezing point and high density of the hydrocarbon composition of the invention.

In one aspect of the invention the hydrocarbon composition has a freezing point of −40° C., or preferably −43° C. or below. Typically, the lowest freezing point can be −60° C. The lowest measurable freezing point is −80° C. It is required that the freezing point of a composition to be used as a jet fuel is −40° C. or lower. The freezing point of aviation fuel is measured according to the standard IP529. It is obviously highly crucial that a jet fuel remains pumpable in all possible conditions to ensure that the aircraft gas-turbine engine is fully functional. Especially, when a jet fuel or jet fuel component is produced from a biological or renewable source it can sometimes be difficult to reach the low freezing points required. This is especially difficult in paraffinic renewable fuel components, where the overall yield is important.

In one aspect of the invention the hydrocarbon composition is produced from a renewable source (renewable raw material). Here, the term renewable source or renewable raw material is meant to include feedstocks other than those obtained from petroleum crude oil (fossil-based oil or petroleum based oil). The renewable source that can be used in the present invention include, but is not limited to, bio oils and fats from plants and/or animals and/or fish and/or insects, and from processes utilizing microbes, such as algae, bacteria, yeasts and moulds, and suitable are also compounds derived from said fats and oils and mixtures thereof. The species yielding the bio oils or fats may be natural or genetically engineered. The bio oils and fats may be virgin oils and fats or recycled oils and fats.

Suitable bio oils containing fatty acids and/or fatty acid esters and/or fatty acid derivatives are wood-based and other plant-based and vegetable-based fats and oils such as rapeseed oil, colza oil, canola oil, tall oil, jatropha seed oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above, as well as fats and oils originating from processes utilizing microbes, such as algae, bacteria, yeasts and moulds.

The renewable source also includes recyclable waste oils and fats or residues of recyclable waste oils and fats.

Bio oil and fat suitable as fresh feed may comprise C12-C24 fatty acids, derivatives thereof such as anhydrides or esters of fatty acids as well as triglycerides and diglycerides of fatty acids or combinations of thereof. Fatty acids or fatty acid derivatives, such as esters may be produced via hydrolysis of bio oils or by their fractionalization or transesterification reactions of triglycerides or microbiological processes utilizing microbes.

The isomerised paraffins of the hydrocarbon composition according to the current invention can be produced by any suitable method. In one embodiment the paraffins are produced from renewable oil, such as vegetable oil or animal fat, which is subjected to a deoxygenation process for removal of heteroatoms, mainly oxygen from the renewable oil.

In a preferred embodiment, the deoxygenation treatment, to which the renewable raw material is subjected, is hydrotreatment. Preferably, the renewable raw material is subjected to hydrodeoxygenation (HDO) which preferably uses an HDO catalyst. Catalytic HDO is the most common way of removing oxygen and has been extensively studied and optimized. However, the present invention is not limited thereto. As the HDO catalyst, an HDO catalyst comprising hydrogenation metal supported on a carrier may be used. Examples include an HDO catalyst comprising a hydrogenation metal selected from a group consisting of Pd, Pt, Ni, Co, Mo, Ru, Rh, W or a combination of these. Alumina or silica is suited as a carrier, among others. The hydrodeoxygenation step may, for example, be conducted at a temperature of 100-500° C. and at a pressure of 10-150 bar (absolute).

In an embodiment, the isomerised paraffins component is produced through Fischer-Tropsch process starting from gasification of biomass. This synthesis route is generally also called BTL, or biomass to liquid. It is well established in the literature that biomass, such as lignocellulosic material, can be gasified using oxygen or air in high temperature to yield a gas mixture of hydrogen and carbon monoxide (syngas). After purification of the gas, it can be used as feedstock for a Fischer-Tropsch synthesis route. In the Fischer-Tropsch synthesis paraffins are produced from syngas. The Fischer-Tropsch paraffins range from gaseous component to waxy paraffins and middle distillate boiling range paraffins can be obtained by distillation from the product.

The n-paraffins formed either through hydrotreating renewable oils or Fischer-Tropsch method need to be subjected to a further isomerisation treatment. The isomerisation treatment causes branching of hydrocarbon chains, i.e. isomerisation, of the hydrotreated raw material. Branching of hydrocarbon chains improves cold properties, i.e. the isomeric composition formed by the isomerisation treatment has better cold properties compared to the hydrotreated raw material. Better cold properties refer to a lower temperature value of a freezing point. The isomeric hydrocarbons, or isomerised paraffins, formed by the isomerisation treatment may have one or more side chains, or branches.

The isomerisation step may be carried out in the presence of an isomerisation catalyst, and optionally in the presence of hydrogen added to the isomerisation process. Suitable isomerisation catalysts contain a molecular sieve and/or a metal selected from Group VIII of the periodic table and optionally a carrier. Preferably, the isomerisation catalyst contains SAPO-11, or SAPO-41, or ZSM-22, or ZSM-23, or fernerite, and Pt, Pd, or Ni, and $Al_2O_3$, or $SiO_2$. Typical isomerisation catalysts are, for example, Pt/SAPO-11/$Al_2O_3$, Pt/ZSM-22/$Al_2O_3$, Pt/ZSM-23/$Al_2O_3$, and Pt/SAPO-11/$SiO_2$. The catalysts may be used alone or in combination. The presence of added hydrogen is particularly preferable to reduce catalyst deactivation.

In a preferred embodiment, the isomerisation catalyst is a noble metal bifunctional catalyst, such as Pt-SAPO and/or Pt-ZSM-catalyst, which is used in combination with hydrogen. The isomerisation step may, for example, be conducted at a temperature of 200-500° C., preferably 280-400° C., and at a pressure of 5-150 bar, preferably 10-130 bar, more preferably 30-100 bar (absolute). The isomerisation step may comprise further intermediate steps such as a purification step and a fractionation step. The isomerisation may be performed e.g. at 300° C. to 350° C.

In an embodiment of the invention the isomerised paraffins formed in the isomerisation process need to be fractionated in order to get a hydrocarbon composition according to the invention. Fractionation of the isomerised paraffins is not necessary if the formed isomerised paraffins fulfils the requirements of the hydrocarbon composition according to the invention. The fractionation can be performed using any suitable method and is not limited to distillation. Distillation is the most commonly used method for separating various fractions from hydrocarbon compositions and is also suitable here.

According to another aspect the invention also relates to a fuel or a fuel component comprising a hydrocarbons composition according to the invention. In another aspect of the invention the fuel or fuel component is a jet fuel or jet fuel component.

In one aspect the invention concerns a jet fuel containing a hydrocarbon component according to the invention in a content up to 50 vol. % of the jet fuel and the balance being petroleum based jet fuel. Preferably the jet fuel contains a hydrocarbon component according to the invention in a concentration from 3 vol. % to 50 vol. %, more preferably from 5 vol. % to 45 vol. % and even more preferably from 10 vol. % to 30 vol. %. The balance in the jet fuel according to the invention being petroleum based jet fuel. With the term "petroleum based jet fuel" is meant any conventional jet fuel or aviation fuel produced from petroleum or crude oil that fulfils at least one specification for jet fuels. Specifications for jet fuel or aviation fuel include but are not limited to Jet A, Jet A-1 (DEF STAN 91-91, ASTM D1655) and various military standards (JP-1 to JP-8).

According to another aspect the invention also relates to a method to produce a hydrocarbon composition according to the invention. The method to produce the hydrocarbon composition comprises the following method steps:
 providing a renewable feedstock comprising fatty acids,
 deoxygenating the feedstock to produce paraffins,
 subjecting the produced paraffins to an isomerisation step to produce isomerised paraffins, and
 fractionating the produced isomerised paraffins to obtain a hydrocarbon composition according to the invention.

In an embodiment the fractionation comprises fractionating the produced isomeric paraffins according to the invention as one single fraction with yield of at least 20 wt-%, preferably with yield of at least 30 wt-%, most preferably with yield of at least 40 wt-%.

EXAMPLES

Example 1 (Comparative)

A renewable paraffinic product was produced by heavily cracking hydrodeoxygenation and isomerisation of feedstock mixture of vegetable and animal fat origin. This product was analysed using various analysis methods (Table 2).

TABLE 2

Analysed renewable paraffinic product.

| Analysis | Method | Unit | Value |
| --- | --- | --- | --- |
| Freezing point | IP529 | ° C. | −42.0 |
| Density | ASTM D4052 | kg/m3 | 753.0 |
| Weighted average carbon number | NM490 | — | 12.0 |
| % carbon number 14-17 | NM490 | wt-% | 30.5 |
| T10 (° C.) cut-off temperature | ASTM D86 | ° C. | 168.5 |
| T90 (° C.) cut-off temperature | ASTM D86 | ° C. | 245.5 |
| Final boiling point | ASTM D86 | ° C. | 256.0 |

The analysed product in Table 2 fulfils the freezing point of jet fuel specification, but the freezing point is not exceptionally low.

Example 2 (Comparative)

A renewable paraffinic product was produced by hydrodeoxygenation and isomerisation of feedstock mixture of vegetable and animal fat origin. This product was analysed using various analysis methods (Table 3).

TABLE 3

Analysed renewable paraffinic product.

| Analysis | Method | Unit | Value |
| --- | --- | --- | --- |
| Freezing point | IP529 | ° C. | −41.0 |
| Density | ASTM D4052 | kg/m3 | 774.1 |

TABLE 3-continued

Analysed renewable paraffinic product.

| Analysis | Method | Unit | Value |
| --- | --- | --- | --- |
| Weighted average carbon number | NM490 | — | 15.6 |
| % carbon number 14-17 | NM490 | wt-% | 55.8 |
| T10 (° C.) cut-off temperature | ASTM D86 | ° C. | 210.0 |
| T90 (° C.) cut-off temperature | ASTM D86 | ° C. | 289.0 |
| Final boiling point | ASTM D86 | ° C. | 308.2 |

The analysed product in Table 3 fulfils the freezing point of jet fuel specification, but the freezing point is not exceptionally low.

Example 3

A renewable paraffinic product produced by hydrodeoxygenation and isomerisation of feedstock mixture of vegetable and animal fat origin in Example 2 is further directed to a fractionation unit. In the fractionation unit, the renewable paraffinic product is divided into two fractions. Lighter of the fractions containing 80 wt-% of the original renewable paraffinic product is re-analysed using various analysis methods (Table 4).

TABLE 4

Analysed renewable paraffinic product.

| Analysis | Method | Unit | Value |
| --- | --- | --- | --- |
| Freezing point | IP529 | ° C. | −49.1 |
| Density | ASTM D4052 | kg/m3 | 771.6 |
| Weighted average carbon number | NM490 | — | 15.0 |
| % carbon number 14-17 | NM490 | wt-% | 68.5 |
| T10 (° C.) cut-off temperature | ASTM D86 | ° C. | 198.6 |
| T90 (° C.) cut-off temperature | ASTM D86 | ° C. | 280.3 |
| Final boiling point | ASTM D86 | ° C. | 287.5 |

This analysed product fulfils all requirements of a high-quality renewable aviation fuels. From the analysis results it can be seen that when the density of the paraffinic product is below 772 kg/m$^3$ (measured 771.6 kg/m$^3$) the freezing point drops significantly to −49.1° C., compared to the product of comparative example 2.

Example 4

Another renewable paraffinic product produced by hydrodeoxygenation and isomerisation of another feedstock mixture of vegetable and animal fat origin is further directed to a fractionation unit. In the fractionation unit, the renewable paraffinic product is divided into two fractions. Lighter of the fractions containing 80 wt-% of the original renewable paraffinic product is re-analysed using various analysis methods (Table 5).

TABLE 5

Analysed renewable paraffinic product.

| Analysis | Method | Unit | Value |
| --- | --- | --- | --- |
| Freezing point | IP529 | ° C. | −50.9 |
| Density | ASTM D4052 | kg/m3 | 770.1 |
| Weighted average carbon number | NM490 | — | 14.7 |
| % carbon number 14-17 | NM490 | wt-% | 73.6 |
| T10 (° C.) cut-off temperature | ASTM D86 | ° C. | 191.9 |
| T90 (° C.) cut-off temperature | ASTM D86 | ° C. | 276.6 |
| Final boiling point | ASTM D86 | ° C. | 283.1 |

This product also fulfils all requirements of a high-quality renewable aviation fuels. From the analysis results it can be seen that despite the fact that the density of the paraffinic composition is over 768 kg/m³ (measured 770.1 kg/m³) the freezing point (measured −50.9° C.) is significantly lower than the freezing point of the product of comparative example 1.

It will be obvious to a person skilled in the art that, as the technology advances, the inventive concept can be implemented in various ways. The invention and its embodiments are not limited to the examples described above but may vary within the scope of the claims.

The invention claimed is:

1. A hydrocarbon composition comprising:
   isomerized paraffins;
   wherein the hydrocarbon composition has a T10 (° C.) cut-off temperature from 185 to 205° C., a T90 (° C.) cut-off temperature from 270 to 295° C., and a final boiling point (° C.) from 275 to 300° C.;
   a density of the hydrocarbon composition from 768.0 to 772.0 kg/m³ as measured using standard ASTM D4052;
   a freezing point of equal to or lower than −40° C.; and
   an amount of isomerized paraffins of over 90 wt-% as calculated from total paraffinic content of the hydrocarbon composition.

2. The hydrocarbon composition according to claim 1, wherein the amount of isomerized paraffins is over 92 wt-% as calculated from the total paraffinic content of the hydrocarbon composition.

3. The hydrocarbon composition according to claim 2, wherein the density of the hydrocarbon composition is from 770.0 to 772.0 kg/m³.

4. The hydrocarbon composition according to claim 3, wherein at least 60 wt % of the hydrocarbons have a carbon number from 14 to 17.

5. The hydrocarbon composition according to claim 1, wherein the amount of isomerized paraffins is over 95 wt-% as calculated from the total paraffinic content of the hydrocarbon composition.

6. The hydrocarbon composition according to claim 1, wherein the density of the hydrocarbon composition is from 770.0 to 772.0 kg/m³.

7. The hydrocarbon composition according to claim 1, wherein at least 60 wt % of the hydrocarbons have a carbon number from 14 to 17.

8. The hydrocarbon composition according to claim 1, in combination with a fuel or fuel component.

9. The hydrocarbon composition according to claim 8, wherein the fuel or fuel component is a jet fuel or a jet fuel component.

10. The hydrocarbon composition according to claim 8, wherein the fuel or fuel component is a jet fuel comprising:
    up to 50 vol. % of the hydrocarbon composition containing isomerized paraffins;
    wherein the hydrocarbon composition has a T10 (° C.) cut-off temperature from 185 to 205° C., a T90 (° C.) cut-off temperature from 270 to 295° C., and a final boiling point (° C.) from 275 to 300° C.;
    a density of the hydrocarbon composition is from 768.0 to 772.0 kg/m³ as measured using standard ASTM D4052;
    a freezing point of equal to or lower than −40° C.; and
    an amount of isomerized paraffins of over 90 wt-% as calculated from a total paraffinic content of the hydrocarbon composition; and
    a balance of the fuel or fuel component is a petroleum based jet fuel.

11. The hydrocarbon composition according to claim 8, wherein the fuel or fuel component is a jet fuel comprising:
    from 3 vol. % to 50 vol. % of the hydrocarbon composition containing isomerized paraffins;
    wherein the hydrocarbon composition has a T10 (° C.) cut-off temperature from 185 to 205° C., a T90 (° C.) cut-off temperature from 270 to 295° C., and a final boiling point (° C.) from 275 to 300° C.;
    a density of the hydrocarbon composition from 768.0 to 772.0 kg/m³ as measured using standard ASTM D4052;
    a freezing point of equal to or lower than −40° C.;
    an amount of isomerized paraffins of over 90 wt-% as calculated from a total paraffinic content of the hydrocarbon composition; and
    a balance of the fuel or fuel component is a petroleum based jet fuel.

12. A method to produce a hydrocarbon composition, wherein the method comprises:
    providing a renewable feedstock containing fatty acids;
    deoxygenating the feedstock to produce paraffins;
    subjecting the produced paraffins to isomerization to produce isomerized paraffins; and
    fractionating the produced isomerized paraffins to obtain a hydrocarbon composition;
    wherein the hydrocarbon composition has a T10 (° C.) cut-off temperature from 185 to 205° C., a T90 (° C.) cut-off temperature from 270 to 295° C., and
    a final boiling point (° C.) from 275 to 300° C.;
    a density of the hydrocarbon composition from 768.0 to 772.0 kg/m³ as measured using standard ASTM D4052;
    a freezing point of equal to or lower than −40° C.; and
    an amount of isomerized paraffins of over 90 wt-% as calculated from a total paraffinic content of the hydrocarbon composition.

13. The method of claim 12, wherein the fractionation comprises:
    fractionating the produced isomerized paraffins so that the hydrocarbon composition contains isomerized paraffins;
    wherein the hydrocarbon composition has a T10 (° C.) cut-off temperature from 185 to 205° C., a T90 (° C.) cut-off temperature from 270 to 295° C., and a final boiling point (° C.) from 275 to 300° C.;
    a density of the hydrocarbon composition from 768.0 to 772.0 kg/m³ as measured using standard ASTM D4052;
    a freezing point of equal to or lower than −40° C.; and
    an amount of isomerized paraffins of over 90 wt-% as calculated from a total paraffinic content of the hydrocarbon composition obtained as a single fraction with a yield of at least 20 wt-%, calculated based on a total isomerized paraffin content.

14. The method of claim 12, wherein the fractionation comprises:
    fractionating the produced isomerized paraffins so that the hydrocarbon composition contains isomerized paraffins;
    wherein the hydrocarbon composition has a T10 (° C.) cut-off temperature from 185 to 205° C., a T90 (° C.) cut-off temperature from 270 to 295° C., and a final boiling point (° C.) from 275 to 300° C.;
    a density of the hydrocarbon composition from 768.0 to 772.0 kg/m³ as measured using standard ASTM D4052;
    a freezing point of equal to or lower than −40° C.;
    an amount of isomerized paraffins of over 90 wt-% as calculated from the total paraffinic content of the hydrocarbon composition obtained as a single fraction with a yield of at least 20 wt-%, calculated based on a total isomerized paraffin content.

* * * * *